(12) United States Patent
Sun et al.

(10) Patent No.: US 10,964,100 B2
(45) Date of Patent: Mar. 30, 2021

(54) DATA-DRIVEN MODELING OF ADVANCED PAINT APPEARANCE

(71) Applicant: Adobe Inc., San Jose, CA (US)

(72) Inventors: Xin Sun, Santa Clara, CA (US); Zhili Chen, San Jose, CA (US); Nathan Carr, San Jose, CA (US); Julio Marco Murria, Saragossa (ES); Jimei Yang, Mountain View, CA (US)

(73) Assignee: ADOBE INC., San Jose, CA (US)

( * ) Notice: Subject to any disclaimer, the term of this patent is extended or adjusted under 35 U.S.C. 154(b) by 61 days.

(21) Appl. No.: 16/126,552

(22) Filed: Sep. 10, 2018

(65) Prior Publication Data

US 2020/0082610 A1 Mar. 12, 2020

(51) Int. Cl.
| | |
|---|---|
| *G06T 15/80* | (2011.01) |
| *G06F 3/0488* | (2013.01) |
| *G06T 3/40* | (2006.01) |
| *G06T 7/11* | (2017.01) |
| *G06T 15/00* | (2011.01) |
| *G06N 3/08* | (2006.01) |

(52) U.S. Cl.
CPC .......... *G06T 15/80* (2013.01); *G06F 3/04883* (2013.01); *G06N 3/08* (2013.01); *G06T 3/4046* (2013.01); *G06T 7/11* (2017.01); *G06T 15/005* (2013.01); *G06T 2207/20112* (2013.01)

(58) Field of Classification Search
CPC combination set(s) only.
See application file for complete search history.

(56) References Cited

U.S. PATENT DOCUMENTS

| | | | |
|---|---|---|---|
| 8,766,982 B2* | 7/2014 | Noris | G06K 9/00416 345/441 |
| 9,600,907 B2 | 3/2017 | Kim et al. | |
| 9,922,432 B1* | 3/2018 | Risser | G06T 11/001 |
| 10,062,214 B2 | 8/2018 | Sun et al. | |
| 10,339,443 B1* | 7/2019 | Medioni | H03H 17/0202 |
| 2013/0335434 A1* | 12/2013 | Wang | G06N 20/20 345/581 |
| 2018/0089894 A1 | 3/2018 | Sun et al. | |
| 2018/0114358 A1 | 4/2018 | Chen et al. | |
| 2018/0197327 A1 | 7/2018 | Sun et al. | |
| 2019/0188535 A1* | 6/2019 | Chen | G06K 9/6262 |
| 2019/0272463 A1* | 9/2019 | Medioni | G06N 3/0454 |

OTHER PUBLICATIONS

Chen et al., "Wetbrush: GPU-based 3D Painting Simulation at the Bristle Level" (Year: 2015).*

(Continued)

*Primary Examiner* — Hilina K Demeter
(74) *Attorney, Agent, or Firm* — F. Chau & Associates, LLC

(57) ABSTRACT

According to one general aspect, systems and techniques for rendering a painting stroke of a three-dimensional digital painting include receiving a painting stroke input on a canvas, where the painting stroke includes a plurality of pixels. For each of the pixels in the plurality of pixels, a neighborhood patch of pixels is selected and input into a neural network and a shading function is output from the neural network. The painting stroke is rendered on the canvas using the shading function.

17 Claims, 5 Drawing Sheets

(56) References Cited

OTHER PUBLICATIONS

Sloan, Peter-Pike, et al., "Precomputed radiance transfer for real-time rendering in dynamic, low-frequency lighting environments", ACM Transactions on Graphics (TOG), 2002, vol. 21, No. 3, pp. 527-536.

Chen, Zhili, et al., "Wetbrush: GPU-based 3D painting simulation at the bristle level", ACM Transactions on Graphics (TOG), 2015, 34(6), 11 pages.

Nalbach, Oliver, et al., "Deep shading: convolutional neural networks for screen space shading", In Computer graphics forum, Jul. 2017, vol. 36, No. 4, pp. 65-78.

Ren, Peiran, et al., "Global illumination with radiance regression functions", ACM Trans. Graph., 2013, 12 pages.

Sloan, Peter-Pike, et al., "Precomputed radiance transfer for real-time rendering in dynamic, low-frequency lighting environments", ACM Transactions on Graphics (TOG), vol. 21, No. 3, pp. 527-536.

\* cited by examiner

200

```
┌─────────────────────────────────────────────────────┐
│ Receive a painting stroke input on a canvas, where  │
│ the painting stroke includes multiple pixels        │
│                        202                          │
└─────────────────────────────────────────────────────┘
                          │
                          ▼
┌─────────────────────────────────────────────────────┐
│ For each of the pixels, select a neighborhood patch │
│ of pixels                                           │
│                        204                          │
└─────────────────────────────────────────────────────┘
                          │
                          ▼
┌─────────────────────────────────────────────────────┐
│ For each of the pixels, input the neighborhood      │
│ patch of pixels into a neural network               │
│                        206                          │
└─────────────────────────────────────────────────────┘
                          │
                          ▼
┌─────────────────────────────────────────────────────┐
│ For each of the pixels, output a shading function   │
│ from the neural network                             │
│                        208                          │
└─────────────────────────────────────────────────────┘
                          │
                          ▼
┌─────────────────────────────────────────────────────┐
│ Render the painting stroke on the canvas using the  │
│ shading function                                    │
│                        210                          │
└─────────────────────────────────────────────────────┘
```

FIG. 2

DATA-DRIVEN MODELING OF ADVANCED PAINT APPEARANCE

TECHNICAL FIELD

This description relates to data-driven modeling of advanced paint appearance.

BACKGROUND

A computer-based, impasto painting system may be used to create realistic digital artworks. For instance, artists may use the painting system to simulate real-time interactions among brush, paint, and canvas at the bristle level. The painting system focuses on modeling and simulating the dynamics of geometry and material modeling to create the realistic digital artworks. Still, challenges exist for the computer-based impasto painting system in order to provide the same experience as traditional painting in the real world and achieve digital artworks that are visually indistinguishable from real painting.

One technical challenge is that impasto painting artwork includes detailed geometry, which is a full three-dimensional (3D) model instead of a simplified two-dimensional (2D) image. Therefore, complex lighting effects, including shadowing, inter-reflections and sub-surface scattering play an important role in the appearance of the painting. Furthermore, artists paint with different materials that reflect and respond to light in different ways (i.e., some materials are shiny whereas other may be matte or even translucent in nature). Computing accurate appearance for such digitally painted artwork is extremely challenging requiring one to fully simulate the global transport of light (also referred to as the global light transport).

Said another way, each pixel of the digital artwork represents a thickness of the paint on the canvas at that location, which to make a realistic rendering, influences other pixels due to the thickness, color and other properties of the rendered pixel. Another technical challenge is that instant feedback is critical to both the artists who are painting the artwork using the computer-based painting system and the users who are viewing the artwork. Therefore, the real-time performance for run-time rendering of the digital artwork is critical to give artists instant feedback during the design process.

Prior systems and techniques do not provide a technical solution that meets both challenges. For instance, some solutions may simply render local shading effects with little or few global light transport effects. Such systems do not provide a high quality realistic depiction of the painted canvas. An assumption may be made that the pixel thickness, which would be a representation of the paint thickness, is zero when determining shading effects, meaning that each individual pixel has no shading effect on other pixels. In these solutions, the rendering performance may be acceptable, but the quality achieved falls short of matching the complex lighting effects of a real painting.

Other solutions may render a completed artwork using a physically-based light transport simulation method. For instance, every brush stroke by the artist may cause a re-rendering of the artwork, which takes a perceptibly long time to re-render due to the computational complexities of the solutions. In these solutions, a robust rendering of the artwork may be attained but without providing any real-time rendering or interactions, which is highly desirable to the artist. In practice, artists need real-time feedback to make effective design choices; otherwise, the final artwork will not look like the one that they painted. Real-time interaction is not achieved by prior solutions; namely, the artist is not able to paint a stroke and get the painting results simultaneously as the stroke is being painted.

SUMMARY

According to one general aspect, systems and techniques for rendering a painting stroke of a three-dimensional digital painting include receiving a painting stroke input on a canvas, where the painting stroke includes a plurality of pixels. For each of the pixels in the plurality of pixels, a neighborhood patch of pixels is selected and input into a neural network and a shading function is output from the neural network. The painting stroke is rendered on the canvas using the shading function.

The technical solution is achieved by a system and techniques that generate a local shading function on-the-fly for each pixel in a paint stroke and render its global light transport effects. More specifically, for each pixel in a paint stroke, a local neighborhood patch of pixels is input into a neural network to evaluate the shading function at run-time. The neural network takes the neighborhood patch of pixels and its geometries (e.g., height fields) and materials properties as input and outputs the shading function, which represents the global light transport effect of the pixel across the pixels in the neighborhood patch. The painting stroke is rendered using the shading functions generated by the neural network for each pixel in the painting stroke. The result of the technical solution is a computer-based painting system that renders complicated light transport effects with instant feedback that provides real-time interaction between the brush stroke and the visually rendered stroke for the artist to see.

The details of one or more implementations are set forth in the accompanying drawings and the description below. Other features will be apparent from the description and drawings, and from the claims.

BRIEF DESCRIPTION OF THE DRAWINGS

FIG. 2 is a flowchart illustrating example operations of the system of FIG. 1.

DETAILED DESCRIPTION

Figure 1:
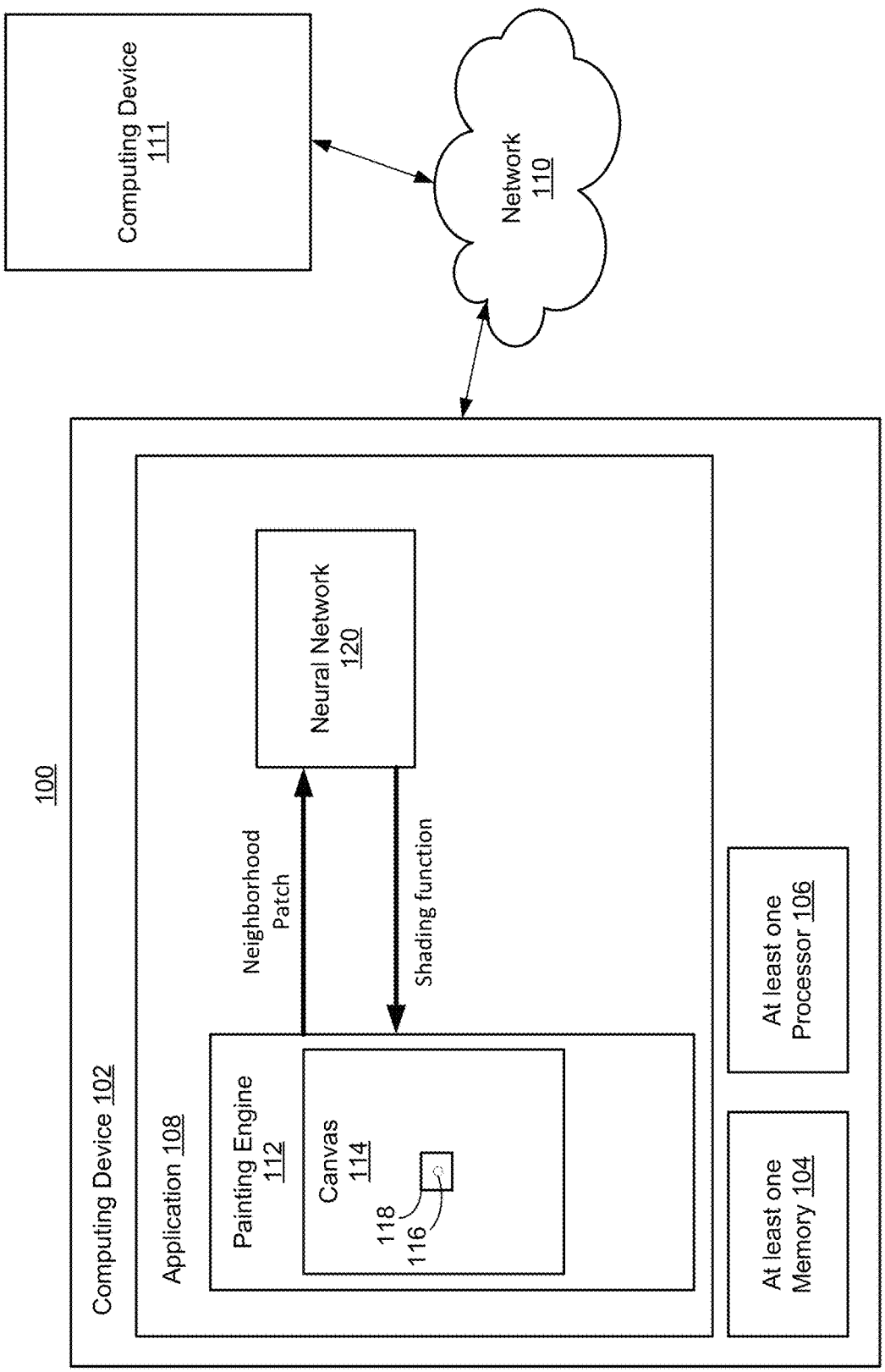
FIG. 1 is a block diagram of a system designed to render complicated light transport effects for a computer-based impasto painting system with real-time performance.

This document describes a system and techniques for rendering complicated light transport effects for a computer-based impasto painting system with real-time performance. The system and techniques provides a technical solution to the challenges described above, namely to render realistic light effects on the digital artwork that provides instant feedback to the artist as the artist brushes the stroke.

The technical solution is achieved by a system and techniques that generate a local shading function on-the-fly for each pixel in a paint stroke and render its global light transport effects. More specifically, for each pixel in a paint stroke, a local neighborhood patch of pixels is input into a neural network to evaluate the shading function at run-time. The neural network takes the neighborhood patch of pixels and its geometries (e.g., height fields) and materials properties as input and outputs the shading function, which represents the global light transport effect of the pixel across the pixels in the neighborhood patch. The painting stroke is rendered using the shading functions generated by the neural network for each pixel in the painting stroke. The result of the technical solution is a computer-based painting system that renders complicated light transport effects with instant feedback that provides real-time interaction between the brush stroke and the visually rendered stroke for the artist to see.

The local shading function that is rendered provides the equivalent effect of the global light transport but in a much faster rendering process than conventional techniques such that the global light transport is immediately visible to the artist during the painting process without any appreciable delay. The conventional simulation steps typically required to generate the global light transport are eliminated. The local shading function that is output from the neural network is a high resolution color feature. The rendering of the high resolution color feature with the stroke of the brush in effect provides the global light transport effect without the complex computational steps normally needed to generate the global light transport effect.

To realize the effect of the global light transport by rendering the shading function, a neural network is used, as mentioned above. The neural network receives as input a two dimensional (2D) neighborhood patch of pixels. The encoding layers of the neural network gradually reduce the resolution of the neighborhood patch of pixels and increase the feature map of the neighborhood patch of pixels. For instance, in some implementations, the resolution of the neighborhood patch of pixels may be reduced to a 2×2 resolution with a feature map containing 64 features. In some implementations, the resolution of the neighborhood patch of pixels may be reduced to a 1×1 resolution with a feature map containing 256 features. After the encoding layers of the neural network process the neighborhood patch to reduce the resolution and increase the feature map, the shading function output by the neural network may be generated in multiple different ways. For instance, the shading function output by the neural network may be represented by four dimensional (4D) table, such as a 4D tensor, a 4D bidirectional reflectance distribution function (BRDF) or a 4D bidirectional scattering surface reflectance distribution function (BSSRDF), or as a Gaussian Mixture Model (GMM), which is the mathematical equivalent of the 4D table.

In some implementations, the shading function output by the neural network is represented by a 4D table. After the encoding layers of the neural network reduce the resolution and increase the feature map of the neighborhood patch, the neural network reshapes the 2D neighborhood patch of pixels to a 4D table. The 4D table includes two dimensions representing the direction of the incoming light and two dimensions representing an outgoing direction as viewed from an eye of a viewer. The decoding layers of the neural network gradually increases the resolution of the 4D table and decreases the features. The final output is a 4D table, which is a representation of the local shading function. As noted above, the local shading function is a high resolution color feature, which is representative of the global light transport.

In some implementations, the shading function out by the neural network is represented by a GMM, where the neural network outputs the parameters for the GMM. After the encoding layers of the neural network reduce the resolution and increase the feature map, the neural network applies a function to obtain the parameters for the GMM. The GMM is the mathematical equivalent of the 4D table and represents the local shading function. As noted above, the local shading function is a high resolution color feature, which is a representation of the global light transport.

Additional details of the technical solution and the system and techniques are provided below with respect to the figures.

As used herein, a neighborhood patch refers to an area surrounding a pixel. In some implementations, the area surrounding the pixel may be defined by a geometric shape that surrounds and aligns with the pixel. In some implementations, the geometric shape is a square that surrounds and aligns with a pixel in the center of the square. The geometric shape defines an area around the pixel with the pixel at its center.

As used herein, the bidirectional reflectance distribution function (BRDF) refers to the reflectance of a target as a function of illumination geometry and viewing geometry. BRDF is a function of four real variables that defines how light is reflected at an opaque surface. BRDF depends on wavelength and is determined by the structural and optical properties of the surface, such as shadow-casting, multiple scattering, mutual shadowing, transmission, reflection, absorption, and emission by surface elements, facet orientation distribution, and facet density.

As additional background, in general, neural networks, especially deep neural networks have been very successful in modeling high-level abstractions in data. Neural networks are computational models used in machine learning made up of nodes organized in layers. The nodes are also referred to as artificial neurons, or just neurons, and perform a function on provided input to produce some output value. A neural network requires a training period to learn the parameters, i.e., weights, used to map the input to a desired output. The mapping occurs via the function. Thus, the weights are weights for the mapping function of the neural network.

Each neural network is trained for a specific task, e.g., image upscaling, prediction, classification, encoding, etc. The task performed by the neural network is determined by the inputs provided, the mapping function, and the desired output. Training can either be supervised or unsupervised. In supervised training, training examples are provided to the neural network. A training example includes the inputs and a desired output. Training examples are also referred to as labeled data because the input is labeled with the desired output. The network learns the values for the weights used in the mapping function that most often result in the desired output when given the inputs. In unsupervised training, the network learns to identify a structure or pattern in the provided input. In other words, the network identifies implicit relationships in the data. Unsupervised training is used in deep neural networks as well as other neural networks and typically requires a large set of unlabeled data and a longer training period. Once the training period completes, the neural network can be used to perform the task it was trained for.

In a neural network, the neurons are organized into layers. A neuron in an input layer receives the input from an external source. A neuron in a hidden layer receives input from one or more neurons in a previous layer and provides output to one or more neurons in a subsequent layer. A neuron in an output layer provides the output value. What the output value represents depends on what task the network is trained to perform. Some neural networks predict a value given in the input. Some neural networks provide a classification given the input. When the nodes of a neural network provide their output to every node in the next layer, the neural network is said to be fully connected. When the neurons of a neural network provide their output to only some of the neurons in the next layer, the network is said to be convolutional. In general, the number of hidden layers in a neural network varies between one and the number of inputs.

To provide the output given the input, the neural network must be trained, which involves learning the proper value for a large number (e.g., millions) of parameters for the mapping function. The parameters are also commonly referred to as weights as they are used to weight terms in the mapping function. This training is an iterative process, with the values of the weights being tweaked over thousands of rounds of training until arriving at the optimal, or most accurate, values. In the context of neural networks, the parameters are initialized, often with random values, and a training optimizer iteratively updates the parameters, also referred to as weights, of the network to minimize error in the mapping function. In other words, during each round, or step, of iterative training the network updates the values of the parameters so that the values of the parameters eventually converge on the optimal values.

FIG. 1 is a block diagram of a system 100 for rendering complicated light transport effects for a computer-based impasto painting system with real-time performance. The system 100 renders a painting stroke of a three dimensional (3D) digital painting that takes into account and renders the light transport effects of each stroke being painted as the stroke is being painted.

The system 100 includes a computing device 102 having at least one memory 104, at least one processor 106 and at least one application 108. The computing device 102 may communicate with one or more other computing devices over a network 110. For instance, the computing device 102 may communicate with a computing device 111 over the network 110. The computing device 102 may be implemented as a server, a desktop computer, a laptop computer, a mobile device such as a tablet device or mobile phone device, as well as other types of computing devices. Although a single computing device 102 is illustrated, the computing device 102 may be representative of multiple computing devices in communication with one another, such as multiple servers in communication with one another being utilized to perform its various functions over a network.

The at least one processor 106 may represent two or more processors on the computing device 102 executing in parallel and utilizing corresponding instructions stored using the at least one memory 104. The at least one processor 106 may include a graphics processing unit (GPU) and/or a central processing unit (CPU). The at least one memory 104 represents a non-transitory computer-readable storage medium. Of course, similarly, the at least one memory 104 may represent one or more different types of memory utilized by the computing device 102. In addition to storing instructions, which allow the at least one processor 106 to implement the application 108 and its various components, the at least one memory 104 may be used to store data, such as one or more of the objects generated by the application 108 and its components used by the application 108.

The network 110 may be implemented as the Internet, but may assume other different configurations. For example, the network 110 may include a wide area network (WAN), a local area network (LAN), a wireless network, an intranet, combinations of these networks, and other networks. Of course, although the network 110 is illustrated as a single network, the network 110 may be implemented as including multiple different networks.

The application 108 may be accessed directly by a user of the computing device 102. In other implementations, the application 108 may be running on the computing device 102 as a component of a cloud network, where a user accesses the application 108 from another computing device over a network, such as the network 110. In one implementation, the application 108 may be a painting application. The painting application may be an application that provides a three-dimensional (3D) painting simulation at the bristle level. The application 108 simulates the interactions among brush, paint and canvas at the bristle level. The application 108 also renders complicated light transport effects for each painting stroke in real-time to provide real-time interaction for the artist and the simulated painting. The painting application may be a standalone application that runs on the computing device 102. Alternatively, the painting application may be an application that runs in another application such as a browser application.

As mentioned above, the application 108 renders a painting stroke with a brush stroke input and, incorporated as part of the brush stroke, is the light transport effect for each pixel in the stroke in real-time. In this manner, the application 108 provides an interactive painting simulation for the user (e.g. the artist). The application 108 includes a painting engine 112 having a canvas 114. The application 108 through the painting engine 112 enables a user to select use an input device (e.g., electronic paint brush, mouse, finger, trackpad, etc.) to select a brush having bristles and color(s) from a color palette and to input a painting stroke onto the canvas 114 using the brush that has been dipped into the palette. The painting engine 112 provides other features and functionality to enable a painting system that simulates the interactions among brush, paint and canvas 114 at the bristle level.

The canvas 114 is the digital equivalent of a physical canvas on which an artist paints. The canvas 114 provides a digital medium that simulates the physical canvas on which the artist can use impasto techniques to create digital artworks with painting strokes having thick, textured paint (e.g., oil, heavy body acrylics, pastels, other media and thickening agents). On a physical canvas, the impasto techniques also include complex lighting such as self-shadowing, indirect illumination, subsurface scattering, spatially-varying properties and surface reflection. The application 108 simulates these complex lighting characteristics on the canvas 114 with the use of a neural network 120, which is included as part of the application 108.

To simulate these complex lighting effects, the application 108 uses a distant environment lighting and accounts for the effects of the distant environment lighting on a specific point in a local area around the specific point. In this manner, by using a distant environment lighting, instead of local light sources, the effect of the lighting on a specific point on the canvas 114 is the same for that specific point and the local area around the specific point.

Although it's not required, a typical painting stroke on the canvas 114 includes multiple pixels. In FIG. 1, a single pixel 116 from a painting stroke is highlighted for illustration purposes on the canvas 114. As the distant environment lighting hits the pixel 116, it's a very high probability that the next intersection point for the light as it bounces is very close by to the pixel 116. Also, since the canvas 114 is on a planar canvas and its size is much larger that the scale of the local geometry details, it can be assumed that the shading effects on the pixel 116 is determined by its small local neighborhood on the canvas 114, which is referred to as a neighborhood patch 118.

The area surrounding the pixel is referred to as the neighborhood patch 118. As used herein, a neighborhood patch refers to an area surrounding a pixel. In some implementations, the area surrounding the pixel may be defined by a geometric shape that surrounds and aligns with the pixel. In some implementations, the geometric shape is a square that surrounds and aligns with a pixel in the center of the square. The geometric shape defines an area around the pixel with the pixel at its center. In this example of FIG. 1, the neighborhood patch is in the shape of a square. As noted, in some implementations, other geometric shapes may be used to define the neighborhood patch. For instance, other geometric shapes that may be used include a circle, a triangle, a rectangle, etc.

In this manner, for each pixel in a painting stroke, such as the pixel 116, the application 108 generates a shading function, which also may be referred to interchangeably as a local shading function. The application 108 generates the shading function for each pixel on-the-fly, that is as the painting stroke is being brushed on the canvas 114. As mentioned above, when the shading function of the pixel 116 is generated, the shading is computed using distant lighting, meaning that the lighting on the pixel 116 and its neighborhood 118 is independent of the light source position and of other areas of the painting artwork on the canvas 114. In some implementations, a size of the neighborhood patch is 16×16 pixels; that is, 16 pixels in height and 16 pixels in width. In some implementations, the size of the neighborhood patch is smaller than 16×16 pixels. In some implementations, the size of the neighborhood patch is larger than 16×16 pixels.

The shading function provides global light transport effects. The shading function of the pixel 116 is generated according to the geometries and materials of its neighborhood patch 118. It is assumed that all points on the neighborhood patch 118 have the same illumination. It is also assumed that the light illumination on the neighborhood patch 118 is all from a same direction and with the same intensity. The shading function represents the global light transport across the whole neighborhood patch 118. With the generated shading function by the neural network 120, the global light transport effects for the pixel 116 are rendered. The global light transport effects for the pixel 116 are rendered in real-time because of the lower computational cost to render the global light transport effects in this manner.

The neighborhood patch 118 may be represented by a two dimensional (2D) matrix or 2D table that represents and includes information about the pixels in the neighborhood patch 118. For example, every pixel in the neighborhood patch 118 includes geometry and material information. The geometry information may include pixel height (or thickness) information and normal information (or direction information). Said another way, the neighborhood patch 118 includes a height field. The material information represented in the 2D matrix includes pigment, roughness, metallicity and properties of refraction and sub-surface scattering. The size of the neighborhood patch 118 necessary to provide an accurate shading function of the pixel 116 depends on the geometrical and material properties of neighbouring points, since global light transport effects at pixel 116 may depend on prominent paint bumps far from it.

Figure 3B:
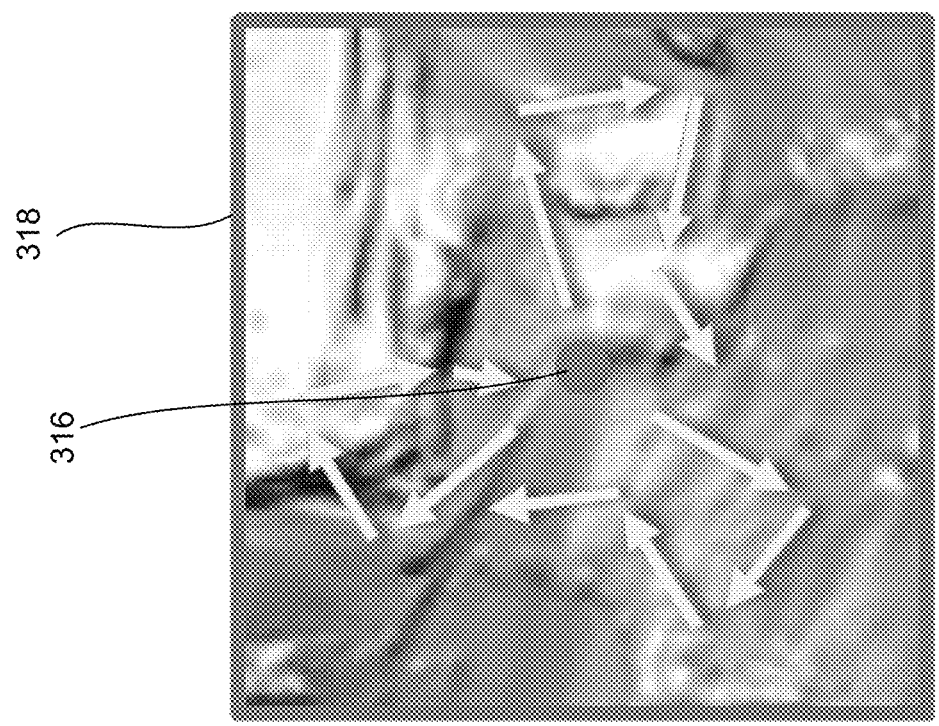
FIG. 3B is an example sketch of a pixel and a neighborhood patch from the digital artwork on the canvas of FIG. 3A.
Figure 3A:
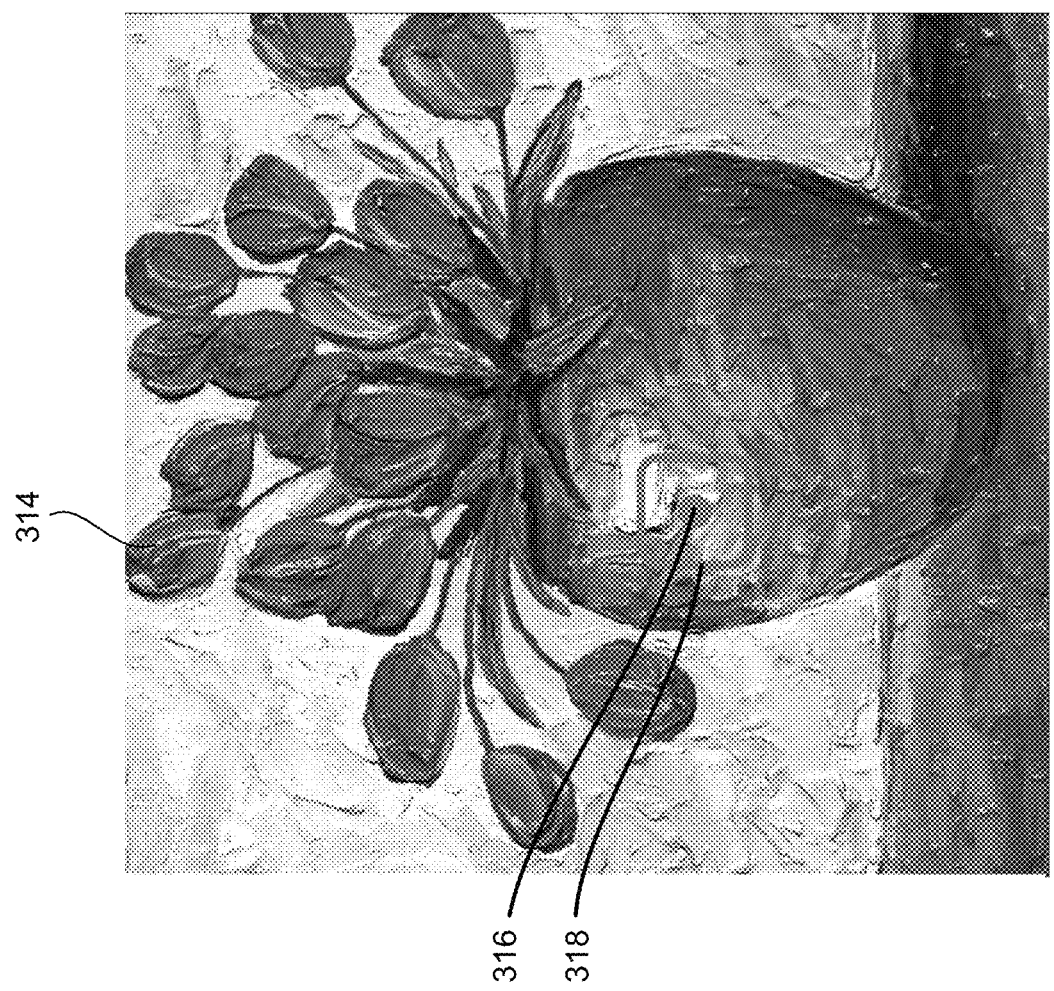
FIG. 3A is an example sketch of a digital artwork on a canvas.

Referring to FIG. 3A, an example sketch illustrates a canvas 314 containing a digital artwork. The canvas 314 includes the same features and functionality as the canvas 114 of FIG. 1. The canvas 314 illustrates a pixel 316 and its neighborhood patch 318. The pixel 316 and its neighborhood patch 318 are similar to the pixel 116 and its neighborhood patch 118 of FIG. 1. In this example, the neighborhood patch 318 is a geometric shape, specifically a square, that surrounds the pixel 316 with the pixel 316 in the center of the square.

Referring also to FIG. 3B, an example sketch illustrates the details of the pixel 316 and the neighborhood patch 318 from the digital artwork on the canvas 314 of FIG. 3A. As discussed above, as the distant environment lighting hits the pixel 316, it's a very high probability that the next intersection point for the light as it bounces is very close by to the pixel 316. Also, since the canvas 314 is on a planar canvas and its size is much larger that the scale of the local geometry details, it can be assumed that the shading effects on the pixel 316 is determined by its neighborhood patch 318.

As seen in FIG. 3B, the arrows illustrate the interaction of light as the light hits the pixel 316. As discussed above, it is a very high probability that the interaction of the light remains within the neighborhood patch 318. Thus, the arrows illustrate that the interaction of the light as it hits the pixel 316 remains local to the pixel 316 and within the area defined by the neighborhood patch 318. In some implementations, the neighborhood patch 318 is selected to be an area that has the highest probability of containing all the light interaction for the pixel 316. The light that hits the pixel 316 does not have any effect on the pixels outside of the neighborhood patch 318.

Referring back to FIG. 1, the operation of the painting engine 112 and the neural network 120 are further described. The painting engine 112 receives each painting stroke on the canvas 114. For each of the pixels in the painting stroke, the painting engine 112 selects a neighborhood patch of pixels, such as neighborhood patch 118 of FIG. 1. The painting engine 112 provides the neighborhood patch 118 as input to the neural network 120.

In general operation, for each pixel in the painting stroke, the neural network 120 is trained and configured to receive as input a neighborhood patch 118 and to output a shading function. In some implementations, the neural network 120 may be a convolutional neural network. The neural network 120 may be trained by training data that is generated from neighborhood patches and their corresponding shading functions by physically based Monte Carlo ray tracing on a set of selected painting patches. The training of the neural network 120 is discussed in more detail below.

As discussed above, the neighborhood patch 118 may be represented by a 2D matrix containing geometry and material information for the neighborhood patch 118 and the 2D matrix is input into the neural network 120. The neural network 120 receives the 2D matrix as input and processes the 2D matrix to generate a shading function for each pixel. The shading function output by the neural network 120 may be a four dimensional (4D) BRDF function. That is, the shading function may be a 4D tensor representation of the shading function. The shading function is parameterized with lighting and viewing directions and tabulated as a 4D matrix. In this situation, the neural network 120 includes a connection of encoding network and decoding network. The encoding network reduces the 2D matrix representing the neighborhood patch to obtain a 1-dimensional (1D) feature vector using convolution operations over the neighborhood patch 118. The decoding network transforms this 1D feature vector into a 4D tensor (the shading function) using convolutions, reshaping and upsampling operations.

More specifically, for each pixel in a paint stroke, a local neighborhood patch of pixels is input into a neural network to evaluate the shading function at run-time. The neural network takes the neighborhood patch of pixels and its geometries (e.g., height fields) and materials properties as input and outputs the shading function, which represents the global light transport effect of the pixel across the pixels in the neighborhood patch. The painting stroke is rendered using the shading functions generated by the neural network for each pixel in the painting stroke. The result of the technical solution is a computer-based painting system that renders complicated light transport effects with instant feedback that provides real-time interaction between the brush stroke and the visually rendered stroke for the artist to see.

The local shading function that is rendered provides the equivalent effect of the global light transport but in a much faster rendering process than conventional techniques such that the global light transport is immediately visible to the artist during the painting process without any appreciable delay. The conventional simulation steps typically required to generate the global light transport are eliminated. The local shading function that is output from the neural network is a high resolution color feature. The rendering of the high resolution color feature with the stroke of the brush in effect provides the global light transport effect without the complex computational steps normally needed to generate the global light transport effect.

To realize the effect of the global light transport by rendering the shading function, a neural network is used, as mentioned above. The neural network receives as input a two dimensional (2D) neighborhood patch of pixels. The encoding layers of the neural network gradually reduce the resolution of the neighborhood patch of pixels and increase the feature map of the neighborhood patch of pixels. For instance, in some implementations, the resolution of the neighborhood patch of pixels may be reduced to a 2×2 resolution with a feature map containing 64 features. In some implementations, the resolution of the neighborhood patch of pixels may be reduced to a 1×1 resolution with a feature map containing 256 features. After the encoding layers of the neural network process the neighborhood patch to reduce the resolution and increase the feature map, the shading function output by the neural network may be generated in multiple different ways. For instance, the shading function output by the neural network may be represented by four dimensional (4D) table, such as a 4D tensor, a 4D bidirectional reflectance distribution function (BRDF) or a 4D bidirectional scattering surface reflectance distribution function (BSSRDF), or as a Gaussian Mixture Model (GMM), which is the mathematical equivalent of the 4D table.

In some implementations, the shading function output by the neural network is represented by a 4D table. After the encoding layers of the neural network reduce the resolution and increase the feature map of the neighborhood patch, the neural network reshapes the 2D neighborhood patch of pixels to a 4D table. The 4D table includes two dimensions representing the direction of the incoming light and two dimensions representing an outgoing direction as viewed from an eye of a viewer. The decoding layers of the neural network gradually increases the resolution of the 4D table and decreases the features. The final output is a 4D table, which is a representation of the local shading function. As noted above, the local shading function is a high resolution color feature, which is representative of the global light transport.

In some implementations, the shading function out by the neural network is represented by a GMM, where the neural network outputs the parameters for the GMM. After the encoding layers of the neural network reduce the resolution and increase the feature map, the neural network applies a function to obtain the parameters for the GMM. The GMM is the mathematical equivalent of the 4D table and represents the local shading function. As noted above, the local shading function is a high resolution color feature, which is a representation of the global light transport.

In some implementations, the painting stroke may include new pixels, which do not have a shading function and for which the application 108 generates a shading function. The painting stroke also may include existing pixels, which may have a shading function. For situations where the pixels already have a shading function, the application 108 updates the shading function. In this manner, a shading function may only need to be updated for existing pixels that have been changed as a result of the painting stroke.

The painting engine 112 is configured to render the painting stroke using the shading function output by the neural network 120. The result is a real-time rendering of the stroke that includes the global light transport effects for each pixel in the painting stroke.

Referring to FIG. 2, an example process 200 illustrates example operations of the system 100 of FIG. 1. Process 200 includes a computer-implemented method for rendering a painting stroke of a 3D digital painting. Process 200 includes receiving a painting stroke input on a canvas, where the painting stroke includes multiple pixels (202). For example, with respect to FIG. 1, the application 108 receives a painting stroke input on the canvas 114, where the painting stroke include multiple pixels. As discussed above, the painting stroke input simulates painting with a real brush at the bristle level with paint and material properties, including the properties discussed above.

Process 200 includes, for each of the pixels in the multiple pixels, selecting a neighborhood patch of pixels (204). For example, for each pixel in the painting stroke, the painting engine 112 selects a neighborhood patch 118 of pixels. For instance, for the pixel 116 on the canvas 114, the painting engine 112 selects the neighborhood patch 118. As discussed above, the neighborhood patch of pixels may include an area defined by a geometric shape with the pixel as a center of the geometric shape and the geometric shape aligned on the pixel. For instance, the pixel 116 is the center of the neighborhood patch 118, which is in the geometric shape of a square that is aligned on the pixel 116. The neighborhood patch of pixels includes a height field and materials information, where the materials information may include surface reflectivity, layered subsurface properties and pigment concentration.

Process 200 includes, for each of the pixels, inputting the neighborhood patch of pixels into a neural network (206). For example, the neighborhood patch 118 is input into the neural network 120. As discussed above, the neural network 120 is trained to receive a patch of pixels, to process the pixels and to output a shading function. The neighborhood patch 118 is sent by the painting engine 112 to the neural network 120 to obtain a shading function for each pixel that is in the painting stroke. The training of the neural network 120 is discussed in more detail below with respect to FIGS. 4 and 5.

Process 200 includes, for each of the pixels in the multiple pixels, outputting a shading function from the neural network (208). For example, the neural network 120 is configured to output a shading function for each of the pixels in the painting stroke by processing a neighborhood patch that is selected for each of the pixels. In this example using one pixel, the neural network outputs the shading function for the pixel 116 based on the processed input of the neighborhood patch 118. In some implementations, the shading function is a 4D tensor representation of the shading function. In some implementations, the shading function is a 4D Gaussian mixture model.

If the pixel in the painting stroke is a newly painted pixel, then a new shading function is generated by the neural network 120 using the selected neighborhood patch for the pixel, as discussed above with respect to FIG. 1. If the pixel in the painting stroke is not a newly painted pixel, then an existing shading function for the pixel may be updated by the neural network 120 based on the neighborhood patch for the pixel. For instance, the painting stroke may be brushed on the canvas 114 to add a new layer of paint on top of existing paint on the canvas. With the original layer of paint on the canvas 114, the neural network generates a shading function for each pixel. For additional strokes of paint on top of existing or original strokes causes the neural network 120 to update the shading function for each pixel in the stroke that already has an existing shading function, which may be stored in the at least one memory 104.

In some implementations where the output of the neural network 120 is a 4D table representing the shading function, a 4D table may be stored in memory for an existing pixel on the canvas 114. In a new painting stroke where the existing pixel is brushed again, the neural network 120 updates the existing 4D table for the existing pixel. The updated 4D table, which represents the local shading function, may change the color of the existing pixel since the local shading function is a high resolution color feature. In effect, the new brush stroke on the canvas over an existing pixel updates the color of the pixel, where the color accounts for the global light transport.

In some implementations where the output of the neural network 102 is a GMM representing the shading function, the parameters for the GMM may be stored in memory for an existing pixel on the canvas 114. In a new painting stroke where the existing pixel is brushed again, the neural network 120 updates the existing GMM parameters for the existing pixel. The updated GMM parameters, which represents the local shading function, may change the color of the existing pixel since the local shading function is a high resolution color feature. In effect, the new brush stroke on the canvas over an existing pixel updates the color of the pixel, where the color accounts for the global light transport.

Process 200 includes rendering the painting stroke on the canvas using the shading function (210). For example, the painting engine 112 renders the painting stroke on the canvas 114 using the shading function that has been generated for each pixel in the stroke. The painting engine 112 renders the painting stroke using the shading function in real time. That is, as the user brushes the canvas 114 with the input device simulating a real paint brush, the application 108 uses the painting engine 112 to select a neighborhood patch for each pixel and generates a shading function for each pixel and paints the stroke on the canvas using the shading function as the stroke goes across the canvas.

Figure 4:
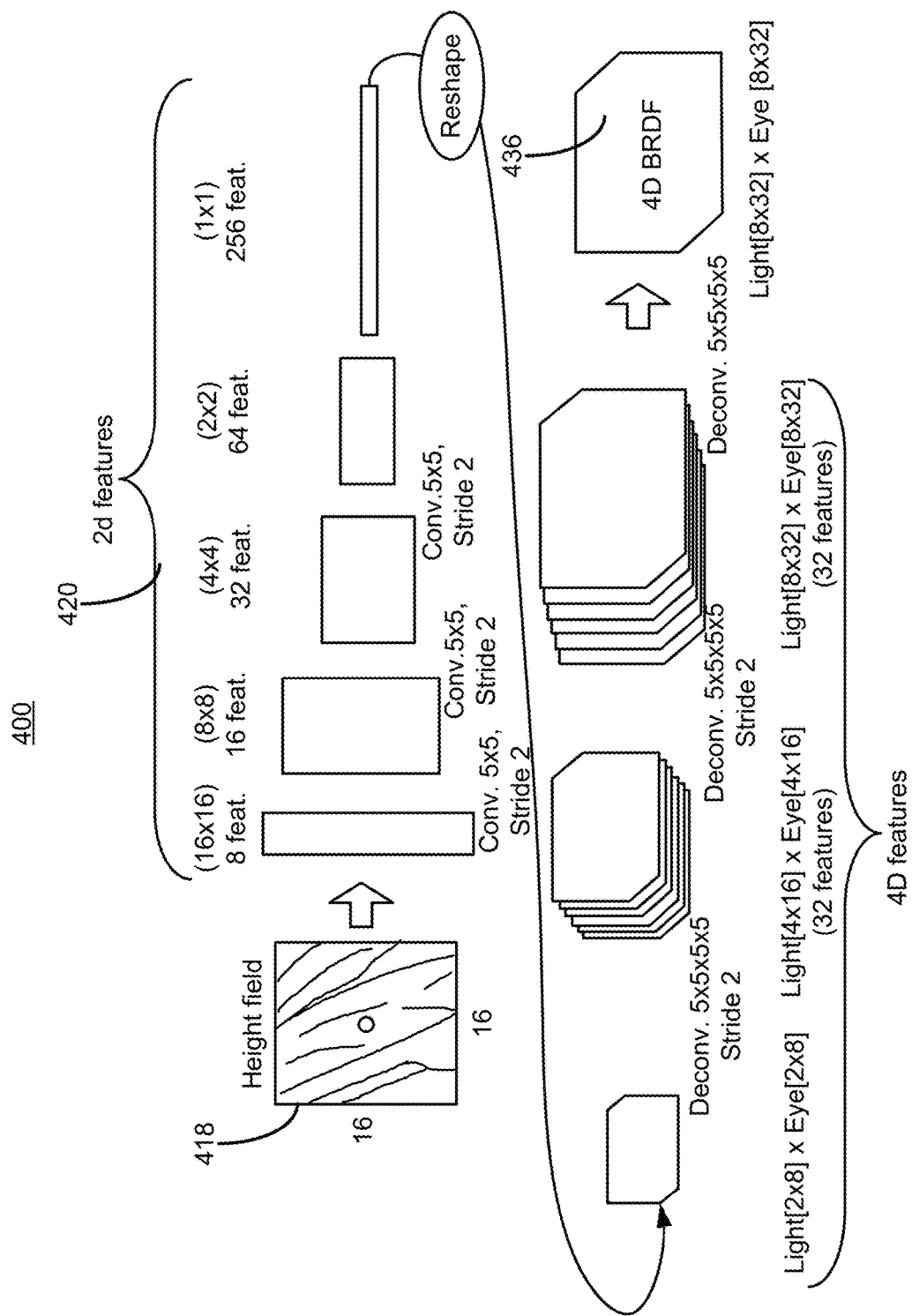
FIG. 4 is an example flow diagram for training a neural network to output a shading function for an input of a neighborhood patch.

FIG. 4 is an example flow diagram 400 for training a neural network to output a shading function for an input of a neighborhood patch. FIG. 4 also represents an example neural network architecture for a neural network that represents the shading function as a 4D table. For example, a neighborhood patch 418 is input into the neural network 420, where the neighborhood patch has a size of 16×16 pixels and the neural network 420 includes a convolutional neural network. Said another way, the neighborhood patch is a 2D image that includes multiple feature values representing a height of the stroke, materials of the stroke and other geometry details of the stroke. During the training process and using multiple layers (e.g., 2 layers, 3 layers, 4 layers, etc.), the neural network performs a gradient descent optimization that runs information of the neighborhood patch 418 through the neural network 420 in iterative passes.

As the neighborhood patch is processed from one layer to another layer in the neural network, the resolution of the neighborhood patch is reduced from layer to layer and the feature map is increased in size. For instance, the 16×16 resolution neighborhood patch includes 8 features. As the neighborhood patch is encoded in the next layer, the resolution of the patch is reduced to 8×8 and the feature map is increased to 16 features. As the neighborhood patch is encoded in the next layer, the resolution of the patch is reduced to 4×4 and the feature map is increased to 32 features. As the neighborhood patch is encoded in the next layer, the resolution of the patch is reduced to 2×2 and the feature map is increased to 64 features. As the neighborhood patch is encoded in the final layer, the resolution of the patch is reduced to 1×1 and the feature map is increased to 256 features. It is understood that this is merely an example architecture and that the neural network may contain fewer or more layers.

In this manner, the 2D features of the neighborhood patch 418 are passed through the stages of the neural network so that they are reshaped into 4D features and output as a 4D BRDF 436. More specifically, once the 1×1 2D matrix or table is reached, the 2D table is reshaped to a 4D table. Then, in the decoding layers of the neural network, the 4D table is gradually increased in resolution and the feature map is reduced. For training the neural network, after a pass, the neural network compares a predicted shading function (4D tensor) against a reference solution of the shading function using a loss function, which quantifies the error. The error is used to update the network parameters and improve the prediction. After a certain error is satisfied, the training is complete.

The trained neural network is then deployed as the neural network 120 of FIG. 1. In the example of FIG. 4, the neural network deployed as the neural network 120 of FIG. 1, the output of the neural network is the 4D table such as a 4D tensor, a 4D bidirectional reflectance distribution function (BRDF) or a 4D bidirectional scattering surface reflectance distribution function (BSSRDF). The 4D table includes two dimensions representing the direction of the incoming light and two dimensions representing an outgoing direction as viewed from an eye of a viewer. The decoding layers of the neural network gradually increases the resolution of the 4D table and decreases the features. The final output is a 4D table, which is a representation of the local shading function. As noted above, the local shading function is a high resolution color feature, which is representative of the global light transport. The 4D table may be stored in memory 104 of FIG. 1.

In some implementations, where the output of the neural network 120 is a 4D BRDF function, the 4D BRDF function may be fit to a 4D GMM. In some implementations, the neural network may be trained to output GMM parameters directly, instead of having to fit the 4D BRDF function to a 4D GMM.

In some implementations, the shading function out by the neural network is represented by a GMM, where the neural network outputs the parameters for the GMM. After the encoding layers of the neural network reduce the resolution and increase the feature map, the neural network applies a function to obtain the parameters for the GMM. The GMM is the mathematical equivalent of the 4D table and represents the local shading function. As noted above, the local shading function is a high resolution color feature, which is a representation of the global light transport.

Figure 5:
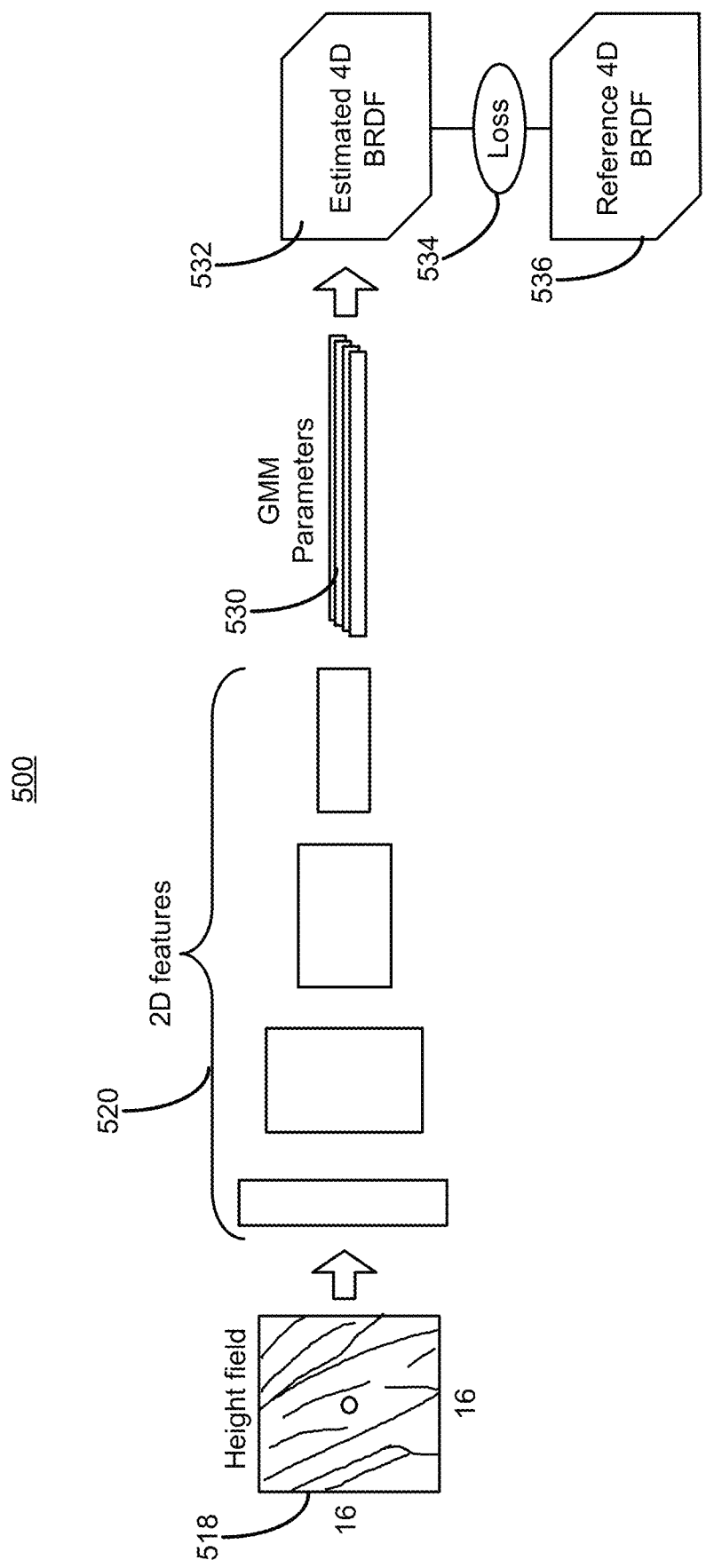
FIG. 5 is an example flow diagram for training a neural network to output a Gaussian Mixture Model shading function for an input of a neighborhood patch.

FIG. 5 is an example flow diagram 500 for training a neural network to output a Gaussian Mixture Model shading function for an input of a neighborhood patch 518, where the size of the neighborhood patch 518 is 16 pixels×16 pixels. Similarly to the flow diagram 400 of FIG. 4, the flow diagram 500 depicting the training, runs the neighborhood patch 518 through the neural network 520, which in this case predicts a set of GMM parameters 530 instead of a 4D tensor. The neural network 520 iterates over the 2D parameters of the neighborhood patch 518 and outputs the GMM parameters 530. These predicted GMM parameters 530 are used to compose an estimated 4D BRDF function 532, which is compared against a reference 4D BRDF solution 536 of the shading function using a suitable loss function 534. This comparison of the predicted solution and reference solution is performed in the same parameter space (either GMM parameter space or angular space of the shading function). The error is used to update the network parameters, improve the prediction and determine the end of the training. The trained neural network is then deployed as the neural network 120 of FIG. 1.

In some implementations, the use of a neural network 120 that outputs GMM parameters may realize an improved performance over one that outputs the 4D BRDF and also may utilize less storage space in memory.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A computer-implemented method for rendering a painting stroke of a three-dimensional digital painting, the method comprising:
   receiving a painting stroke input on a canvas, wherein the painting stroke comprises a plurality of pixels;
   for each pixel in the plurality of pixels:
      selecting a neighborhood patch of pixels,
      inputting the neighborhood patch of pixels into a neural network, and
      outputting a shading function from the neural network in real-time after receiving the painting stroke, wherein the shading function represents a global light transport effect of the pixel across the neighborhood patch of pixels and wherein the neural network outputs the shading function as a four dimensional (4D) tensor by:

using encoding layers of the neural network to reduce a resolution of the neighborhood patch of pixels and increase a feature map of the neighborhood patch of pixels;

reshaping a final encoding layer to a 4D table; and using decoding layers of the neural network to increase the resolution of the 4D table and decrease a number of features of the 4D table to output the 4D tensor representation of the shading function comprising a color feature; and rendering the painting stroke on the canvas using the shading function.

2. The method of claim 1, wherein the neighborhood patch of pixels comprises an area defined by a geometric shape with the pixel as a center of the geometric shape and the geometric shape aligned on the pixel.

3. The method of claim 2, wherein the geometric shape comprises a square.

4. The method of claim 1, wherein the neighborhood patch of pixels comprises a height field and materials information, the materials information including any of surface reflectivity, layered subsurface properties or pigment concentration.

5. The method of claim 1, wherein rendering the painting stroke on the canvas comprises rendering the painting stroke on the canvas using the shading function in real time.

6. The method of claim 1, wherein:

at least one pixel of the plurality of pixels of the painting stroke comprises the shading function for the at least one pixel;

for the at least one pixel:

selecting a neighborhood patch of pixels, inputting the neighborhood patch of pixels into the neural network, and outputting an updated shading function from the neural network; and rendering the painting stroke comprises rendering the painting stroke on the canvas using the updated shading function for the at least one pixel.

7. The method of claim 1, wherein the neural network outputs the shading function as a Gaussian mixture model (GMM) by:

using encoding layers of the neural network to reduce a resolution of the neighborhood patch of pixels and increase a feature map of the neighborhood patch of pixels; and generating parameters for the GMM from a final encoding layer to output the parameters of the GMM representation of the shading function comprising a color feature.

8. A system for rendering a painting stroke of a three-dimensional digital painting, the system comprising:

at least one memory including instructions; and at least one processor that is operably coupled to the at least one memory and that is arranged and configured to execute instructions that, when executed, cause the at least one processor to implement an application, the application comprising:

a painting engine that is configured to:

receive a painting stroke input on a canvas, wherein the painting stroke comprises a plurality of pixels, and for each of the plurality of pixels, select a neighborhood patch of pixels; and a neural network that for each pixel in the plurality of pixels is configured to:

receive the neighborhood patch of pixels, and output a shading function, wherein the shading function comprises a four dimensional (4D) tensor that represents a global light transport effect of the pixel across the neighborhood patch of pixels, wherein the painting engine is configured to render the painting stroke on the canvas using the shading function and wherein the neural network outputs the shading function by:

using encoding layers of the neural network to reduce a resolution of the neighborhood patch of pixels and increase a feature map of the neighborhood patch of pixels;

reshaping a final encoding layer to a 4D table; and using decoding layers of the neural network to increase the resolution of the 4D table and decrease a number of features of the 4D table to output the 4D tensor representation of the shading function comprising a color feature.

9. The system of claim 8, wherein the neighborhood patch of pixels comprises an area defined by a geometric shape with the pixel as a center of the geometric shape and the geometric shape aligned on the pixel.

10. The system of claim 9, wherein the geometric shape comprises a square.

11. The system of claim 8, wherein the neighborhood patch of pixels comprises a height field and materials information, the materials information including any of surface reflectivity, layered subsurface properties or pigment concentration.

12. The system of claim 8, wherein the painting engine renders the painting stroke on the canvas using the shading function in real time.

13. The system of claim 8, wherein:

at least one pixel of the plurality of pixels of the painting stroke comprises the shading function for the at least one pixel;

the neural network for the at least one pixel:

receives the neighborhood patch of pixels into the neural network, and outputs an updated shading function from the neural network; and the painting engine renders the painting stroke the painting stroke on the canvas using the updated shading function for the at least one pixel.

14. The system of claim 8, wherein the neural network outputs the shading function as a Gaussian mixture model (GMM) by:

using encoding layers of the neural network to reduce a resolution of the neighborhood patch of pixels and increase a feature map of the neighborhood patch of pixels; and generating parameters for the GMM from a final encoding layer to output the parameters of the GMM representation of the shading function comprising a color feature.

15. A computer program product for rendering a painting stroke of a three-dimensional digital painting, the computer program product being tangibly embodied on a non-transitory computer-readable storage medium and comprising instructions that, when executed by at least one computing device, are configured to cause the at least one computing device to:

receive a painting stroke input on a canvas, wherein the painting stroke comprises a plurality of pixels;

for each pixel in the plurality of pixels:

selecting a neighborhood patch of pixels, inputting the neighborhood patch of pixels into a neural network, and outputting a shading function from the neural network, wherein the shading function takes an incoming light direction and an outgoing light direction as input and represents a global light transport effect of the pixel across the neighborhood patch of pixels, and wherein the neural network outputs the shading function as a four dimensional (4D) tensor by:

using encoding layers of the neural network to reduce a resolution of the neighborhood patch of pixels and increase a feature map of the neighborhood patch of pixels;

reshaping a final encoding layer to a 4D table; and using decoding layers of the neural network to increase the resolution of the 4D table and decrease a number of features of the 4D table to output the 4D tensor representation of the shading function comprising a color feature; and rendering the painting stroke on the canvas using the shading function.

16. The computer program product of claim 15, wherein the neighborhood patch of pixels comprises an area defined by a geometric shape with the pixel as a center of the geometric shape and the geometric shape aligned on the pixel.

17. The computer program product of claim 15, wherein the neural network outputs the shading function as a Gaussian mixture model (GMM) by:

using encoding layers of the neural network to reduce a resolution of the neighborhood patch of pixels and increase a feature map of the neighborhood patch of pixels; and generating parameters for the GMM from a final encoding layer to output the parameters of the GMM representation of the shading function comprising a color feature.

* * * * *